United States Patent
Pelta et al.

(10) Patent No.: US 11,232,256 B1
(45) Date of Patent: Jan. 25, 2022

(54) SYSTEM AND METHOD FOR MANAGING DATA SHARE REQUESTS

(71) Applicant: Synchrony Bank, Draper, UT (US)

(72) Inventors: Murray Pelta, Atlanta, GA (US);
Rachel Marks, Kansas City, KS (US);
Sven Miller, Salt Lake City, UT (US);
Annmarie Nowak, Bartlett, IL (US);
Joseph Jurchak, Valatie, NY (US);
James McCarthy, Matthews, NC (US);
Christine Schultz, Stamford, CT (US);
Justin Heller, Stamford, CT (US)

(73) Assignee: SYNCHRONY BANK, Stamford, CT (US)

(*) Notice: Subject to any disclaimer, the term of this patent is extended or adjusted under 35 U.S.C. 154(b) by 0 days.

(21) Appl. No.: 15/666,800

(22) Filed: Aug. 2, 2017

(51) Int. Cl.
*G06F 40/174* (2020.01)
*G06Q 10/06* (2012.01)

(52) U.S. Cl.
CPC ....... *G06F 40/174* (2020.01); *G06Q 10/0635* (2013.01)

(58) Field of Classification Search
CPC .. G06F 17/243; G06F 40/174; G06Q 10/0635
USPC ........................................................ 715/224
See application file for complete search history.

(56) References Cited

U.S. PATENT DOCUMENTS

| | | | | |
|---|---|---|---|---|
| 7,921,045 | B1* | 4/2011 | Mamorsky | G06Q 30/02 705/35 |
| 9,870,579 | B2* | 1/2018 | Zuccarino | H04L 67/306 |
| 2002/0120474 | A1* | 8/2002 | Hele | G06Q 10/10 705/4 |
| 2003/0153991 | A1* | 8/2003 | Visser | G06Q 10/10 700/79 |
| 2004/0139421 | A1* | 7/2004 | Hall | G06F 8/30 717/101 |
| 2006/0089861 | A1* | 4/2006 | King | G06Q 10/06 705/4 |
| 2014/0129457 | A1* | 5/2014 | Peeler | G06Q 10/067 705/317 |
| 2014/0143165 | A1* | 5/2014 | Posse | G06Q 50/01 705/319 |

OTHER PUBLICATIONS

Singh, B. C. "A Risk-Benefit Driven Architecture for Personal Data Release" (Year: 2016).*

* cited by examiner

*Primary Examiner* — Stephen S Hong
*Assistant Examiner* — Nicholas Hasty
(74) *Attorney, Agent, or Firm* — Polsinelli

(57) ABSTRACT

A system and method for managing data share requests. An electronic form processing module receives a request to share data relating to an organization with an entity not affiliated with the organization. The request includes responses to questions presented in an electronic form. At least some of the questions presented in the electronic form are presented based on a response to a previously asked question in the electronic form. A score calculation module calculates a score based on the responses to the questions presented in the electronic form. A risk analysis module determines whether to approve, deny or escalate the request to share data based on the score.

33 Claims, 16 Drawing Sheets

Fig. 4A

| Question Number | Question | Routing | Requirements | Options |
|---|---|---|---|---|
| 0 | BEFORE ANY QUESTIONS:<br>Header: Data Sharing Request Form<br>Instruction: Please enter a name for the data transmission. | n/a | • Free Form Text box<br>• No scoring (informational)<br>• No Routing or Triggering | Free Form Text |
| 1 | Select the type of request for this data share transmission. | n/a | • NOTE: For renewals, the name entered should be similar to the name of the data transmission associated with the renewal.<br>• Question must display<br>• Answer must be provided<br>• Drop down list or radio button<br>• Only one option can be selected<br>• When Q1 is answered (Renewal or Amendment) then Q2 is displayed next | Renewal<br>Amendment<br>New |
| 2 | Search and select the name of the data transmission associated with this renewal/amendment. | n/a | • Answer must be provided<br>• Search and Select Text box<br>• No Scoring (informational)<br>• Search by Name only<br>• Search results displays both the Name and Data Share request sequence number<br>• Only one search result name can be selected | Search & Select Text Field<br>NOTE: Search results display both the data transmission name and number. Only the data transmission number will display once a data transmission name is selected. |
| 3 | How will the recipient use the data? | Legal Counsel if = Marketing or Other Activities<br>Supervisory Affairs (f= Credit, Compliance or Risk Activities | • Question must display<br>• Answer must be provided<br>• Drop down list or radio button<br>• Only one option can be selected<br>• Scoring based on Option selected<br>• Route to Legal for GLBA Validation | 1. Other Activities<br>2. Marketing Campaigns<br>3. Credit Activities<br>4. Compliance Activities<br>5. Risk Activities |
| 4 | Enter the Recipient/Third Party legal entity name associated with this request in the field provided. | n/a | • Question must display<br>• Answer must be provided<br>• Free Form Text box<br>• Must be answered<br>• No scoring (informational)<br>• When Q3 is answered (2. Marketing ...) then Q5 is displayed next after Q4 | Free Form Text |
| 5 | Select the appropriate offering associated with this request. | Legal Counsel | • Answer must be provided<br>• Drop down list or radio button<br>• Only one option can be selected<br>• Scoring based on Option selected | 3. Unrelated<br>5. Bank Offer (include Bank) |

Fig. 4B

| Question Number | Question | Section | Requirements | Options |
|---|---|---|---|---|
| 6 | Select the method of transmission that will be used for this data transfer. | Information Security | • Question must display<br>• Answer must be provided<br>• Drop down list or radio button<br>• Only one option can be selected<br>• Scoring based on Option selected | 1. Physical Media<br>2. Electronic Data Exchange<br>4. External Library<br>4. Real-time access<br>5. Email |
| 6.1 | Enter the external library URL in the field provided. | n/a | • When Q6 is answered (External Library) then Q6.1 is displayed after 6<br>• Answer must be provided<br>• URL Text box<br>• No scoring (informational) | URL Text Field |
| 6.2 | Enter External Library Community Name. | n/a | • When Q6 is answered (External Library) then Q6.2 is displayed after 6.1<br>• Answer must be provided<br>• URL Text box<br>• No scoring (informational) | Text Field |
| 6.3 | Enter External Library Community description/purpose. | n/a | • When Q6 is answered (External Library) then Q6.3 is displayed after 6.2<br>• Answer must be provided<br>• URL Text box<br>• No scoring (informational) | Text Field |
| 6.4 | Choose External Library Community type. | Information Security | • When Q6 is answered (External Library) then Q6.4 is displayed after 6.3<br>• Drop down list or radio button<br>• Only one option can be selected<br>• Answer must be provided<br>• URL Text box<br>• No scoring (informational) | • Open<br>• Restricted |

Fig. 4C

| Question Number | Question | Validation | Requirements | Options |
|---|---|---|---|---|
| 6.5 | If you are sharing records please select all record series that apply. | n/a | • When Q6 is answered (External Library) then Q6.5 is displayed after Q6.4<br>• Answer Should be Optional<br>• Search and Select Text Field (Multiple Selections)<br>• One or more options can be selected<br>• No scoring (informational) | • Search & Select Text Field of Record Types/Series |
| 6.6 | What is the Client Access method For Real-time access? | Information Security | • When Q6 is answered (Real-time access) then Q6.6 is displayed as the next question after Q6<br>• Answer must be provided<br>• Drop down list or radio button<br>• Only one options can be selected<br>• No scoring (informational) | Internet<br>Dedicated line<br>Other |
| 6.7 | What is the type of end user access for Real-time access? | Information Security | • When Q6 is answered (Real-time access) then Q6.7 is displayed as the next question after Q6.6<br>• Answer must be provide<br>• Drop down list or radio button<br>• Only one options can be selected<br>• No scoring (informational) | • Client/Retailer Only<br>• Cardholder/Consumer Only<br>• Both<br>• Other |
| 6.8 | Enter the Client URL for Real-time access. | n/a | • When Q6 is answered (Real-time access) then Q6.8 is displayed after 6.7<br>• Answer is optional<br>• URL Text box<br>• No scoring (informational) | URL Text Field |
| 6.9 | Is there a current hosting agreement in place with the client for Real-time Access? | Information Security | • When Q6 is answered (Real-time access) then Q6.9 is displayed as the next question after Q6.8<br>• Answer must be provide<br>• Drop down list or radio button<br>• Only one options can be selected<br>• No scoring (informational) | • Yes<br>• No |

Fig. 4D

| Question number | Category | Question | Requirements | Options |
|---|---|---|---|---|
| 6.10 | Information Security | What is the purpose of the Real-time Access? | • When Q6 is answered (Real-time access) then Q6.10 is displayed as the next question after Q6.9<br>• Answer must be provide<br>• Drop down list or radio button<br>• Only one options can be selected<br>• No scoring (informational) | • Account Summary<br>• Single sign on<br>• Auth Buyer Maintenance<br>• Apply (PS/CC)<br>• Account Lookup (PS/CC)<br>• Credit Limit increase (PS/CC)<br>• Buy (Purchase) (PS/CC)<br>• Adjustment (Refund) (PS/CC)<br>• Authorization Only (PS/CC)<br>• Apply Status (PS/CC)<br>• Promo Disclosure (PS/CC)<br>• Other |
| 6.11 | n/a | List any other methods to be used for Real-time Access. | • When Q6 is answered (Real-time access) then Q6.11 is displayed after 6.10<br>• Answer is optional<br>• Text box<br>• No scoring (informational)<br>• Question must display<br>• Answer must be provided<br>• Drop down list or radio button<br>• Only one option can be selected<br>• Scoring based on Option selected | Text Field |
| 7 | Information Security | Select the expected frequency that corresponds to this data transfer. (If not certain, select an estimated frequency.) | | 1.One Time Transfer<br>1. On Demand<br>2.Daily<br>2. Weekly<br>3. Monthly<br>4. Quarterly<br>5. Semi-annually<br>5. Annually |

Fig. 4E

| Question Number | Question | Validation | Requirement | Options |
|---|---|---|---|---|
| | | | Question Must Display | 1 month |
| | | | Trans method = Any and Frequency = One Time Transfer - Expiration period choices = 1 month, 3 months, 6 months | 3 months |
| | | | Trans method = Email and Frequency= Any - Expiration period choices = 1 month, 3 months, 6 months | 6 months |
| | | | Trans method = External Library and Frequency= Any - Expiration period choices = 1 month, 3 months, 6 months, 9 months, 1 year | 9 months |
| 7.1 | Choose the expiration period. | n/a | Trans Method = Physical Media, Gentran, Real-time access and Frequency= On Demand, Daily, Weekly, Monthly, Quarterly, Semi-annually, Annually - Expiration period choices = 1 month, 3 months, 6 months, 9 months, 1 year, Indefinitely | 1 year |
| | | | 1 month -- expire 1 month after approval date<br>3 months -- expire 3 months after approval date<br>6 months -- expire 6 months after approval date<br>9 months -- expire 9 months after approval date<br>1 year -- expire 1 year after approval date<br>Indefinitely -- expire 1 year after approval date | Indefinitely |
| 8 | Is this request for a Fair Lending workbook review? | Legal Counsel | • When Q3 is answered (Marketing) then Q8 is displayed after Q7.1. If Q4 is not answered (Marketing) Q8 will not display.<br>• Answer must be provided<br>• Drop down list or radio button<br>• Only one option can be selected<br>• Scoring based on Option selected | 2. No<br>4. Yes |

Fig. 4F

| Question Number | Question | Sub-Function | Business Rules | Options |
|---|---|---|---|---|
| 9 | Has the Initial Privacy Notice for Declined Applicants been set up for declined applicants to receive the privacy notice? | Legal Counsel | • When Q3 is answered (Marketing) then Q9 is displayed after Q8. If Q3 is not answered (Marketing) Q9 will not display.<br>• Question must display<br>• Answer must be provided<br>• Drop down list or radio button<br>• Only one option can be selected<br>• No Scoring (Hard Rule) | • Yes<br>• No |
| 10 | Provide the MRM Campaign Number and Workbook File Name or the URL(s) where the documentation is stored. | n/a | • When answered (No) raise Error Message "the data is not permissible to share" and End Request<br>• When Q8 is answered (Yes) then Q10 is displayed after Q9. If Q8 is answered No Q10 is not displayed<br>• Answer must be provided<br>• URL Text box<br>• No scoring (informational) | URL Text Field |
| 11 | Did you use an Open To Buy Suppression? | Legal Counsel | • When Q8 is answered (Yes) then Q11 is displayed after Q 10. If Q8 is answered No Q11 will not display.<br>• Answer must be provided<br>• Drop down list or radio button<br>• Only one option can be selected<br>• No scoring (informational) | • Yes<br>• No |
| 11.1 | Is there a minimum spend amount? | Legal Counsel | • When Q11 is answered (Yes) then Q11.1 is displayed after Q11. If Q11 is answered No Q11.1 will not display.<br>• Answer must be provided<br>• Drop down list or radio button<br>• Only one option can be selected<br>• No scoring (informational) | • Yes<br>• No |
| 11.2 | If No minimum spend amount, please explain. | n/a | • When Q11.1 is answered (No) then Q11.2 is displayed after 11.1. If Question Q11.2 is answered Yes then Q11.2 will not display.<br>• Answer must be provided<br>• Test Box<br>• No scoring (informational) | Text Box |

Fig. 4G

| Question Number | Question | Validation | Requirements | Options |
|---|---|---|---|---|
| 12 | What is the nature of the Third Party relationship with SYF? | Legal Counsel if =Client Partner; Supplier Management if = Vendor/Supplier or Partner Vendor; Supervisory Affairs = Credit Bureau, Government Agency, Regulatory Agency | • Question must display<br>• Answer must be provided<br>• Drop down list or radio button<br>• Scoring based on Option selected<br>• When Q12 is answered (Regulatory Agency) then Q33 must display and an answer must be provided<br>• When Q12 is not answered (Regulatory Agency) then Q33 will not display.<br>• When Q12 is answered (Vendor/Supplier or Partner/Vendor) then Q13 is displayed next | 1. Vendor/Supplier<br>2. Client/Partner<br>3. Partner Vendor<br>4. Credit Bureau<br>5. Government Authority<br>5. Regulatory Agency |
| 13 | What is the Recipient's Supplier Management inherent Risk Rating? (Contact Supplier Management if not known) | Supplier Management if Q12 = Vendor/Supplier or Partner Vendor otherwise none | • Answer must be provided<br>• Drop down list or radio button<br>• Only one option can be selected<br>• Scoring based on Option selected | 1. Low<br>2. Elevated<br>3. Priority<br>4. Critical<br>5. Don't Know |
| 14 | Is the Recipient/Third Party covered by existing contractual agreements? | Supplier Management | • Question must display<br>• Answer must be provided<br>• Drop down list or radio button<br>• Only one option can be selected<br>• Scoring based on Option selected<br>• When Q14 is answered (4. Yes) then Q15 is displayed next | 2. No<br>4. Yes<br>5. Don't Know |
| 15 | Enter the specific contractual term conditions. | Supplier Management | • Answer must be provided<br>• Free Form Text box<br>• No scoring (informational) | na |
| 16 | Is the Recipient/Third Party covered by existing policies? | Supplier Management | • Question must display<br>• Answer must be provided<br>• Drop down list or radio button<br>• Only one option can be selected<br>• Scoring based on Option selected | 2. No<br>4. Yes<br>5. Don't Know |
| 17 | Is information about non-US residents being shared? | Legal Counsel | • Question must display<br>• Answer must be provided<br>• Drop down list or radio button<br>• Only one option can be selected | • Yes<br>• No |

Fig. 4H

| Question Number | Question | Validator | Requirements | Options |
|---|---|---|---|---|
| 18 | What is the associated Business Objective? | Information Security | • Question must display<br>• Answer must be provided<br>• Drop down list or radio button<br>• Only one option can be selected<br>• Scoring based on Option selected | 1. N/A<br>2. Build for the Future<br>3. Grow the Core<br>4. Heightened Standards<br>5. Don't Know |
| 19 | Select the business process associated with this data transmission. | Legal Counsel if = Marketing or Other Functions<br><br>Supervisory Affairs if= Credit Functions, Compliance Functions or Risk Functions | • Question must display<br>• Answer must be provided<br>• Drop down list or radio button<br>• Only one option can be selected<br>• Scoring based on Option selected | 1. Other Functions<br>2. Marketing Functions<br>3. Credit Functions<br>4. Compliance Functions<br>5. Risk Functions |
| 20 | Open the Excel Channel/Program Opt Out Guide and identify the suppression to be performed for this campaign. Then enter the Row Number from column A of the Excel document or enter the explanation in the field provided if not in accordance with Guide.<br><br>URL to Channel Program Opt out Guide Excel Doc: https://libraries.synchronyfinancial.com/download?fil eid=637581700101&entity_id=252865091018&sid=101 | Legal Counsel | • When Q3 is answered (Marketing) then Q20 must display and an answer must be provided<br>• When Q3 is not answered (Marketing) then Q20 will not display.<br>• Free Form Text box<br>• No scoring (informational)<br>• URL to Channel Program Opt out Guide Excel Doc: https://libraries.synchronyfinancial.com/download?fi leid=637581700101&entity_id=252865091018&sid=10 1 | Free Form Text |
| 20.1 | Enter the complete URL(s) of the suppression supporting documentation, e.g. Waterfall, etc. | n/a | • When Q20 is triggered to be answered then Q20.1 is displayed after Q20<br>• Answer must be provided if Q20 is triggered to be answered<br>• Upload/Attach Document field<br>• URL Text box<br>• No scoring (informational) | • URL Text Field |
| 21 | Has the 3rd party completed the sourcing process? | Supplier Management | • If Q12 is answered Vendor /Supplier or Partner/Vendor Question will display<br>• Answer must be provided<br>• Drop down list or radio button<br>• Only one option can be selected | • Yes<br>• No<br>• Don't Know |

Fig. 41

| Question Number | Question | Validation | Requirements | Options |
|---|---|---|---|---|
| 21 | Has the 3rd party completed the sourcing process? | Supplier Management | • If Q12 is answered Vendor /Supplier or Partner/Vendor Question will display<br>• Answer must be provided<br>• Drop down list or radio button<br>• Only one option can be selected | • Yes<br>• No<br>• Don't Know |
| 22 | Are SLAs in place with the 3rd party? | Supplier Management | • If Q12 is answered Vendor /Supplier or Partner/Vendor Question will display<br>• Answer must be provided<br>• Drop down list or radio button<br>• Only one option can be selected | • Yes<br>• No<br>• Don't Know |
| 23 | Has the 3rd party environment been reviewed by Information Security (3PC)? | Supplier Management | • If Q12 is answered Vendor /Supplier or Partner/Vendor Question will display<br>• Answer must be provided<br>• Drop down list or radio button<br>• Only one option can be selected | • Yes<br>• No<br>• Not Required<br>• Don't Know |
| 23.1 | What was the result of the security review? | Supplier Management | If Q23 is answered Yes then Q23.1 must display after Q23<br>• Question must display if Q23 is answered (Yes)<br>• Answer must be provided<br>• Drop down list or radio button<br>• Only one option can be selected | Free Form Text |
| 24 | Will the data be sent outside of the US? | Legal Counsel | • Question must display<br>• Answer must be provided<br>• Drop down list or radio button<br>• Only one option can be selected<br>• Scoring based on Option selected | 2. No<br>4. Yes<br>5. Don't Know |
| 25 | Has the creative been reviewed and approved by Legal/Compliance for marketing purposes? NOTE: Please Remeber to execute the creative approval process through MRM (URL: https://synchrony.orbisglobal.com/login.aspx?ReturnUrl=%2f) | Legal Counsel | • When Q3 is answered (Marketing) then Q25 must display and an answer must be provided<br>• When Q3 is not answered (Marketing) then Q25 will not display<br>• Question must display<br>• Answer must be provided<br>• Drop down list or radio button<br>• Only one option can be selected<br>• No scoring (informational) | • Yes<br>• No<br>• N/A (no creative involved) |

Fig. 4J

| Question Number | Question | Validation | Requirements | Options |
|---|---|---|---|---|
| 26 | Search and select the types of data (Data Domain(s)) associated with the data elements for this request. | Data Governance | • Question must display<br>• When Q6 is answered (External Library) then answer is optional<br>• Answer must be provided when Q6 other than External Library<br>• Display and Select on Business Asset type Data Domain<br>• Display and Select Text Field<br>• Full list should display<br>• One or more options can be selected<br>• No scoring (informational) | • Display & Select Text Field of Asset Business<br>• Retail Card<br>• Payment Solutions |
| 28 | Select the business unit /sales platform associated with this data transmission request? | Legal Counsel | • Question must display<br>• Answer must be provided<br>• Drop down list or radio button (should be the allowed values for business term "business unit" excluding Acronyms)<br>• Multiple options can be selection<br>• No scoring (informational) | • CareCredit<br>• Deposits |
| 29 | Is the quality of the data being shared within its defined threshold? (Data Quality Score) | Data Governance | • Question must display<br>• Question is Optional to answer<br>• Drop down list or radio button<br>• Only one option can be selected<br>• Scoring based on Option selected | 2. No<br>4. Yes<br>5. Don't Know |
| 30 | What is the data privacy classification associated with this data request?<br>Link to Privacy Policy:<br>https://libraries.synchronyfinancial.com/download?fileid=7443175701018&entity_id=1545736641012&idc=101 | Information Security | • Question must display<br>• Answer must be provided<br>• Drop down list or radio button<br>• Only one option can be selected<br>• Scoring based on Option selected<br>• Answer must be provided | 1. Public<br>2. Confidential<br>3. Confidential with SPII<br>4. Restricted<br>5. Internal |
| 31 | Which of the following Restricted, Confidential with SPII or Critical Data Elements are included in this request? (Select all that apply) | Data Governance | • Full list must be displayed<br>• Multiple options can be selection<br>No Scoring<br>• Question must display<br>• Answer must be provided | - |
| 32 | Select the Encryption Method to be used for this data transfer | Information Security | • Drop down list or radio button | PGP<br>Pkzip<br>NDM<br>SFTP<br>OpenPGP |

Fig. 4K

| Question Number | Question | Validation | Requirements | Options |
|---|---|---|---|---|
| 33 | If the data transmission request is for a Regulatory Report, does the report have the required internal approvals? | Supervisory Affairs | • When Q12 is answered (Regulatory Agency) then Q33 must display and an answer must be provided<br>• When Q12 is not answered (Regulatory Agency) then Q33 will not display<br>• Question must display if triggered by Q12<br>• Answer must be provided<br>• Drop down list or radio button<br>• Only one option can be selected<br>• Scoring based on Option selected<br>• When Q33 is answered (Yes) then Q33.1 is displayed after Q33 | 2. Yes<br>4. No<br>5. Don't Know |
| 33.1 | Select who approved the Regulatory Report from the drop down list | Supervisory Affairs | • Answer must be provided<br>• Drop down list or radio button<br>• Only one option can be selected<br>• No scoring (informational)<br>• When Q33 is answered (Yes) then Q33.2 is displayed after Q33.1 | • General Counsel<br>• Deputy General Counsel |
| 33.2 | Select the date the Regulatory Report was approved. | Supervisory Affairs | • Answer must be provided<br>• Calendar allowing only one Month, Day and year to be selected<br>• No scoring (informational)<br>• When Q33 is answered (Yes) then Q33.3 is displayed after Q33.2 | Calendar Date Selection Field |
| 33.3 | Provide the Regulatory Report Evidence complete URL(s) of the supporting documentation, e.g. Waterfall, etc. | n/a | • Answer must be provided<br>• Upload/Attach Document field<br>• URL Text box<br>• No scoring (informational)<br>• Question must display | • Upload/Attach Document Field<br>• URL Text Field |
| 34 | Is this data transmission request related to data that was corrected due to data quality exceptions after the transmission to a Credit Bureau or consumer? | Data Governance | • Answer must be provided<br>• Drop down list or radio button<br>• Only one option can be selected<br>• No scoring (informational)<br>• When Q34 is answered (Yes) then Q34.1 is displayed next | • Yes<br>• No<br>• Don't Know |
| 34.1 | Enter the associated Consumer Complaint # in the field provided. | n/a | • Answer must be provided<br>• Free Form Text box<br>• No scoring (informational) | Free Form Text |

Fig. 4L

| Question Number | Question | Validations | Requirements | Options |
|---|---|---|---|---|
| 35 | Is World Spend data part of this request? | Legal Counsel | • Question must display<br>• Answer must be provided<br>• Drop down list or radio button<br>• Only one option can be selected<br>• No scoring (informational)<br>• When Q35 is answered (Yes) then Q35.1 is displayed next | • Yes<br>• No |
| 35.1 | What is the data level request for World Spend? | Legal Counsel | • Question must display<br>• Answer must be provided<br>• Drop down list or radio button<br>• Only one option can be selected<br>• No scoring (informational) | • Blind Data<br>• World Spend Flag<br>• World Spend Summary<br>• World Category Summary |
| 36 | Enter a brief description and/or any additional information about this request. | n/a | • Question must display<br>• Answer is optional<br>• Free Form Text box<br>• No scoring (informational) | Free Form Text |
| 37 | Search and select the email address(es) to be Cc'd on request. | n/a | • Question must display<br>• Answer is optional<br>• Drop down list or radio button<br>• One or more options can be selected<br>• No scoring (informational) | Names & Roles |

US 11,232,256 B1

SYSTEM AND METHOD FOR MANAGING DATA SHARE REQUESTS

FIELD OF THE INVENTION

The invention relates to managing and assessing requests to share an organization's data with third parties.

BRIEF SUMMARY OF EXEMPLARY EMBODIMENTS OF THE INVENTION

Exemplary embodiments of the invention are directed to a system and method for managing data share requests. An electronic form processing module receives a request to share data relating to an organization with an entity not affiliated with the organization. The request includes responses to questions presented in an electronic form. At least some of the questions presented in the electronic form are presented based on a response to a previously asked question in the electronic form. A score calculation module calculates a score based on the responses to the questions presented in the electronic form. A risk analysis module determines whether to approve, deny or escalate the request to share data based on the score.

In some embodiments, the questions are related to a recipient of the request to share data; a purpose associated with the request to share data; content of the data that is the subject of the request to share data; a source of the data that is the subject of the request to share data; and/or a method of transmitting the data that is the subject of the request to share data.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIGS. 4A-4L are exemplary questions within the associated process in accordance with an exemplary embodiment of the present invention.

DETAILED DESCRIPTION OF THE EXEMPLARY EMBODIMENTS

Figure 1:
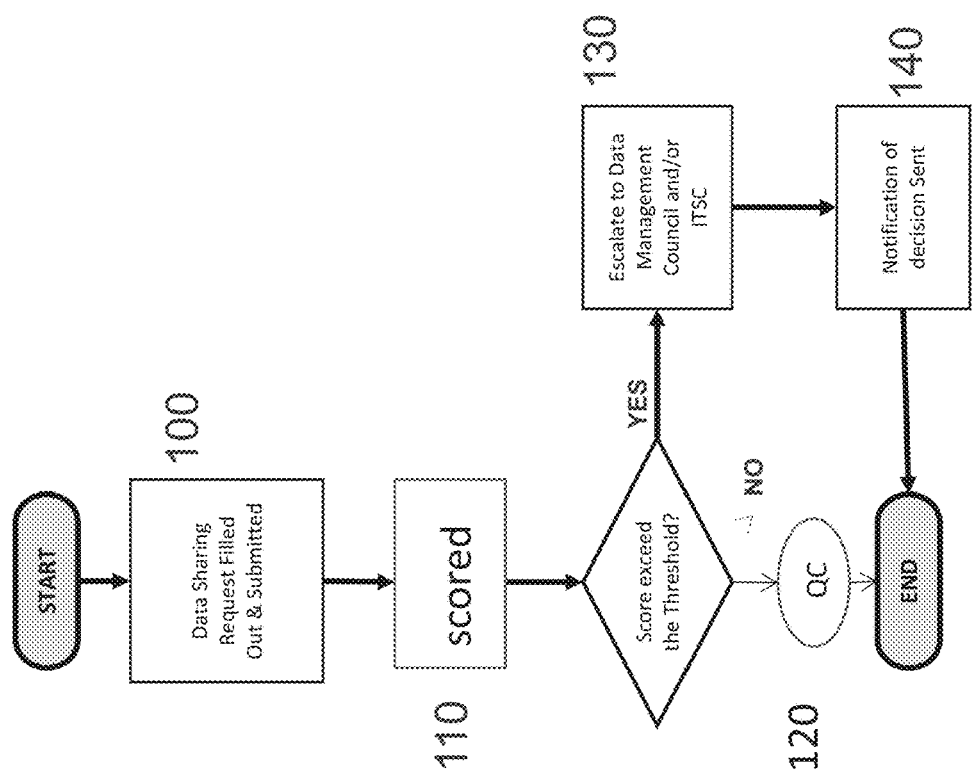
FIG. 1 is a flow diagram illustrating an exemplary process of the present invention.

The systems and methods of the present invention employ new technology used to process requests to share data relating to an organization with an entity that is not affiliated with the organization. More particularly, if data is sought to be transmitted to or shared with external parties (e.g., those that are not part of an organization's legal structure), the inherent risk associated with the data share request must be understood and associated controls applied, prior to the data being shared, in accordance with the organization's requirements, standards and policies. Data that is deemed to have inherent risk above what the organization is willing to tolerate must be approved by way of an established process prior to it being shared.

Existing processes that are used to analyze data share requests are largely implemented in silos, with different departments within an organization analyzing the data share request from a different perspective (e.g., separate reviews for legal, IT security, regulatory affairs, and compliance). This process lacks in efficiency, transparency, and consistency of results.

The present invention presents a unified method of assessing risk associated with a data share request. More particularly, a data share request is reviewed with reference to several risk factor themes, in an exemplary embodiment, as follows:

Recipient: Some recipients are covered under policies (e.g., Credit Bureaus, regulators) or may have contractual agreements in place (e.g., client partners or vendor suppliers) that may influence the assessment of risk associated with the data share request. Other recipients may simply be unauthorized to receive certain kinds or any data.

Purpose: It may be considered whether the quality of the data sought to be shared meets the associated business requirements or the recipients' expectations. The intended purpose of the data share request may be in conflict with the policies of the organization. In some situations, business records are created by the organization, but managed by a third party and may not meet the organization's policies with regard to records and information management.

Content: Critical data elements associated with the data share request may not be of sufficient quality, nor properly defined, for their intended use/purpose. For example, data provided to credit bureaus and consumers may not be measured for accuracy and completeness before it is transmitted. In still other examples, regulatory documents may need to be approved by the organization's counsel before transmission to a third party.

Source: In some instances, critical data elements or business records may be sourced from unauthorized repositories or outside of a defined system of record.

Transmission Method: The transmission method may also be considered. For example, external data transmissions are not implemented in accordance with certain standards applicable to an organization. Information sent over the Internet may be intercepted or altered during transmission or in storage. Individually identifiable customer information and other sensitive information may not be transmitted securely and/or inappropriately used or disclosed.

The process for assessing data share requests should be considered in light of a variety of policies. For example, data that is subject to the policies of the organization or to regulations/laws requires a risk assessment, review and, where appropriate, risk acceptance before it is shared or transmitted to an external entity. By way of further example, data transmissions need to be fully inventoried, risk assessed against policies and legal requirements, tracked and reported upon. Existing, recurring transmissions are periodically re-evaluated based upon their level of risk. Further, critical data transmitted to a third party is associated with a business process that drives the requirements for what is transmitted (in/out bound). Still further, only data required to support the process is transmitted. Moreover, changes to existing approved data transmission arrangements are monitored, assessed, and subjected to re-approval to the extent that such changes are material or significant. By way of other considerations, controls and measurable risk management processes are implemented to limit data transmission to what is needed to service partner relationships and meet the business obligations of an organization and protect data transmissions. Finally, non-standard data transmissions must follow the defined escalation process and are subject to exception tracking. Approvals and exceptions should not be granted for data transmission requests that violate legal requirements.

By way of overview of the inventive process, reference is made to FIG. 1. The individual presenting a data share request completes a form. The data entered onto the form is submitted to the computer system and assessed, in step 100. Based on the data entered into the form, in view of the assessment, the risk associated with the data share request is scored, in step 110. When risks associated with a data share request exceed a baseline threshold, the request will be escalated to upper level management of an organization for risk review, in step 130. Otherwise, the data share request undergoes a quality control review, in step 120. A decision on the data share request is sent to the applicable team, in step 140, and the team implements the decision, thereby ending the process.

Figure 2:
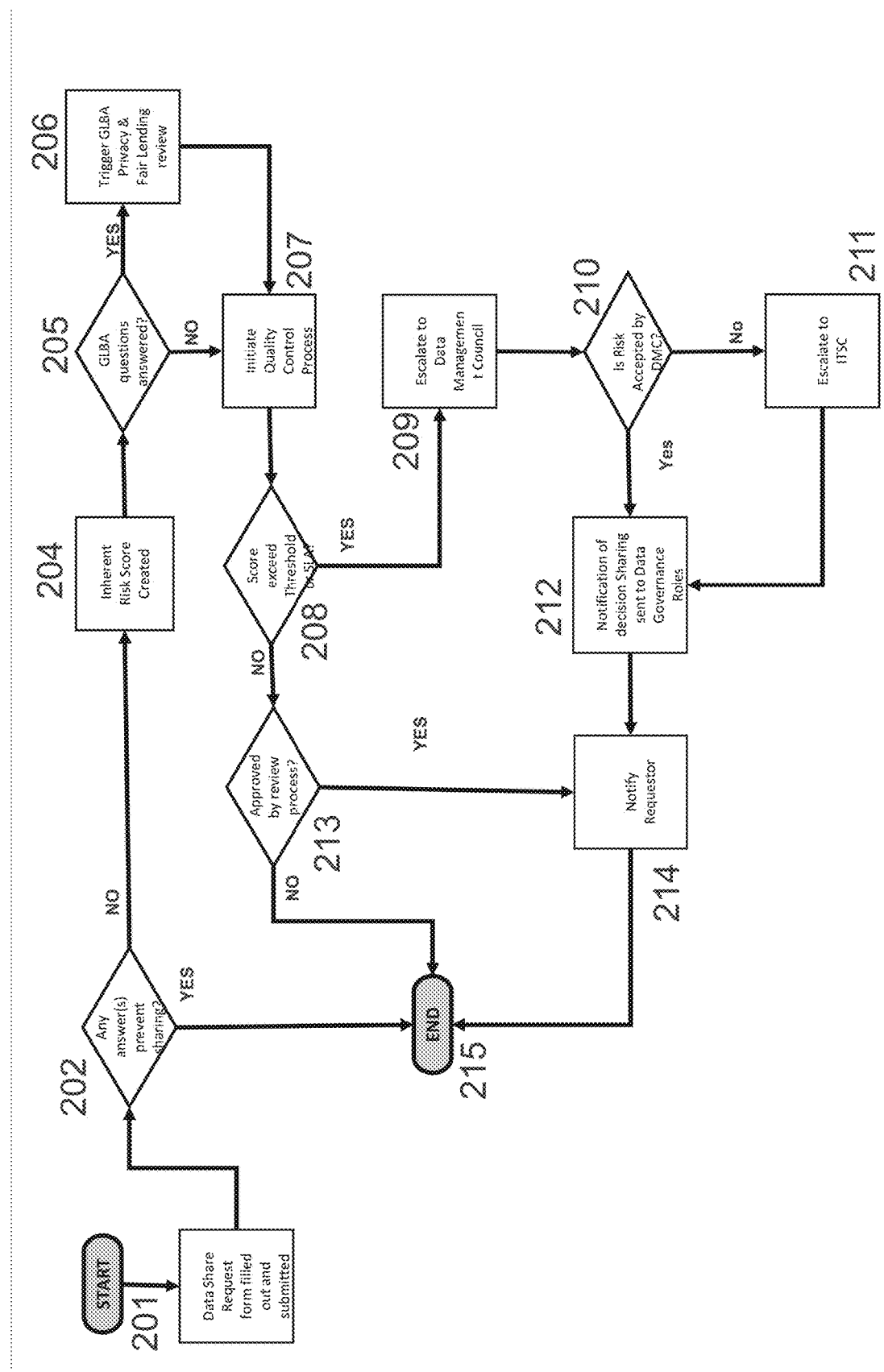
FIG. 2 is a flow diagram illustrating an exemplary process of the present invention.

With reference to FIG. 2, a more detailed description of the process flow is described. In step 201, the data sharing request form is completed by the individual requesting the data share and the form is submitted to the system. In step 202, the answers to the questions in the form are evaluated to determine if data sharing should be prohibited. If so, in step 215, the process ends. If not, in step 204, the answers to the questions in the form are assessed and a risk score is produced, in step 204. In step 205, it is determined whether answers to certain of the questions that may be particularly relevant to an organization (e.g., Gramm-Leach-Bliley Act for financial services companies), in which case a more detailed review of these issues may be conducted in step 206 and it may be determined whether the nature of the data sharing request needs to be changed (e.g., whether the data share request form should be modified or amended and resubmitted, if warranted, pursuant to this this additional, in-depth review). If so, step 201 may be reinitiated. In step 207, additional quality control processes are initiated and the quality control process is undertaken. In step 207, based on the quality control review, it is determined whether the data share request form requires modification or amendment. If so, step 201 may be reinitiated. If not, in step 208 it is determined (by the computer system) whether the score exceeds a threshold score (e.g., more than 3.5). If not, In step 213, a quality control review process executes and determines if it is appropriate to share the data. If so, a notification is sent to the requestor in step 214 with the process ending at step 215. If not, the process may end at step 215 or result in the process restarting with step 201. If in step 208 the risk score exceeds 3.5, then step 209 is executed. In step 209, the request is escalated for further review (e.g., data management council of an organization). In step 210, it is determined whether the risk is acceptable. If not, in step 211 the request is further escalated for executive level review (e.g. a management sub-committee or committee of an organization,). In so, in step 212 a notification of the decision is sent to data governance personnel within the organization and, in step 214, the requestor is notified.

Figure 3:
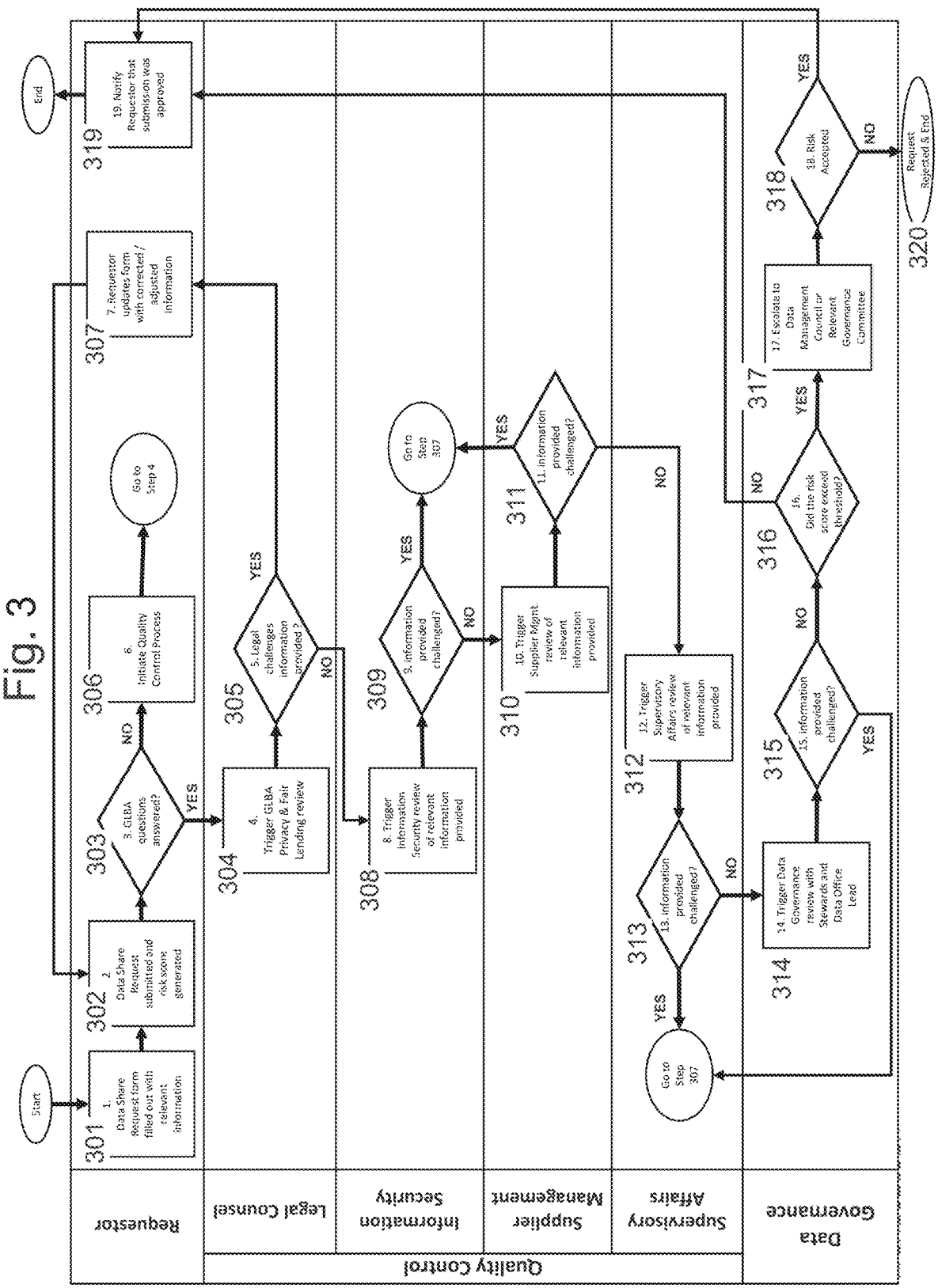
FIG. 3 is a flow diagram illustrating an exemplary process of the present invention.

FIG. 3 describes an exemplary process for implementing quality control (i.e., step 207 of FIG. 2) in more detail. In step 301, the individual initiator of the data share request answers the questions posted in the request form and, in step 302, the answers to the questions are submitted to the system and scored. Steps 303, 304, and 305 are the equivalent of steps 205 and 206 of FIG. 2. As part of step 306, steps 308 and 309 are executed such that the questions and associated responses that are associated with Information Security risks are evaluated by Information Security professionals (e.g., is the data being shared considered personally identification information (PII), is the appropriate method (e.g. email, file feed, internet portal) for how the data will be shared selected, is the appropriate form of encryption or protection selected). In step 309, Information Security can challenge the responses provided should the combinations violate policy. In such instances where a challenge is raised, the request is sent back to the original requestor in step 307 for revision. Otherwise, upon successful review, the data share request will progress to the next quality control step. In steps 310 and 311, if data is being shared with an entity that has a relationship with the company (such as a vendor/supplier, client/partner, or partner vendor), a Supplier Management review is conduced. In step 310, it is considered whether the existing contractual relationship with that entity covers data sharing (e.g., has appropriate confidentiality provisions). Should the combination of data being shared misalign with the nature of the relationship with the company contractually, those answers can be challenged in step 311, resulting in the request being sent back to the requestor for revision in step 307. Once the request completes steps 308 through 311 successfully, the process moves to step 312. In step 312, questions related to sharing data with regulators are reviewed by a Supervisory Affairs group following the same review/challenge process described previously. Based on completion of this review without challenge, a final series of Data Governance reviews take place in Steps 314 to 318, in which questions associated with data quality, data usage and types of data being shared is conducted in steps 314 and 315. In step 316, the risk score associated with the request is updated based on all answers being validated and no longer challenged. In step 316 it is determined whether (based on the risk score exceeding the risk threshold establish by the company) the data sharing request requires an escalated approval (step 317) or if risk acceptance (step 318) is required. If the risk associated with sharing the data requested is not risk accepted, the request is rejected and requestor notified (in step 320). Otherwise, if the risk is accepted or if it the risk did not exceed the threshold, then the requestor is notified (in step 319) and the requestor can share the data consistent with information reviewed and approved.

FIGS. 4A through 4L illustrate the electronic form, workflow-based methodology for submitting and reviewing a data share request. For example, FIG. 4A sets forth the questions that are presented to the requestor by way of an electronic form. FIG. 4A also illustrates the form logic associated with the questions presented and question flow based on the answers to the questions along with which organizational role is involved with the information review/challenge (as described in FIG. 3). For example, with reference to FIG. 4B, if question 6 is answered using the 'External Library' option, then questions 6.1, 6.2, 6.3, 6.4 and 6.5 are presented but, if question 6 is answered using the 'Real-time access' option, then questions 6.6, 6.7, 6.8, 6.9, 6.10 and 6.11 are presented, but if question 6 is answered any other option, then question 7 is presented (skipping question 6.1 through 6.11 inclusively). The answer options are also associated with a number, in the example shown. For example, there for 5 options for answers to question 6: 1—physical media; 2—electronic data exchange; 4—external library; 4—Real-time access and 5—email. The numbers associated with these options are used in the scoring, as described in more detail below. Some answers to questions are informational and not associated with scoring. Certain of the answer fields are free form text fields (e.g., question 1), and some may be through drop down menu (e.g., single selection, multiple selection). Some fields may allow for attaching documents for review or accept as an input a URL pointing to materials for review. FIGS. 4B through 4L show similar examples of answer-based presentation of the electronic form questions.

In one embodiment, a score is determined based on the average of the attributes that contain a numeric value (e.g., step 204 of FIG. 2). By way of a simplified example, if question 3 is answered with a numeric value of 4, question 6 is answered with a value of 3, and question 11 is answered with a value of 5, the score for these questions will be 4+3+5/3=4. The score is then compared to a threshold (e.g., step 208 of FIG. 2). In this example, a 5 point scale may be used and the threshold may be 2. If the score is less than 2, then (subject to quality control review) the data share request may be granted. If the score is 2 or greater, additional review and assessment may be required. Other point scales, scoring techniques or thresholds may be used within the scope of the present invention. Also, other methods of determining whether the risk associated with a data share request is acceptable are within the scope of the present invention. For example, a score may not be used, but another quantitative, objective evaluator of risk may be used, within the scope of the present invention.

A computer is required to carry out the methods of the present invention because the assessment of the request using the workflows requires a significant number of permutations. The number of questions, options and combinations to both create a risk score and to ensure appropriate real-time workflow routing of review results in a deterministic combinatorial problem. Deterministic problems of this size (e.g. over a million combinations—60 questions to the $3^{rd}$ (average number of sub-questions spawned multiplied by 5 (average number of options with scores)) require a computer system to calculate in real-time fashion.

Figure 5:
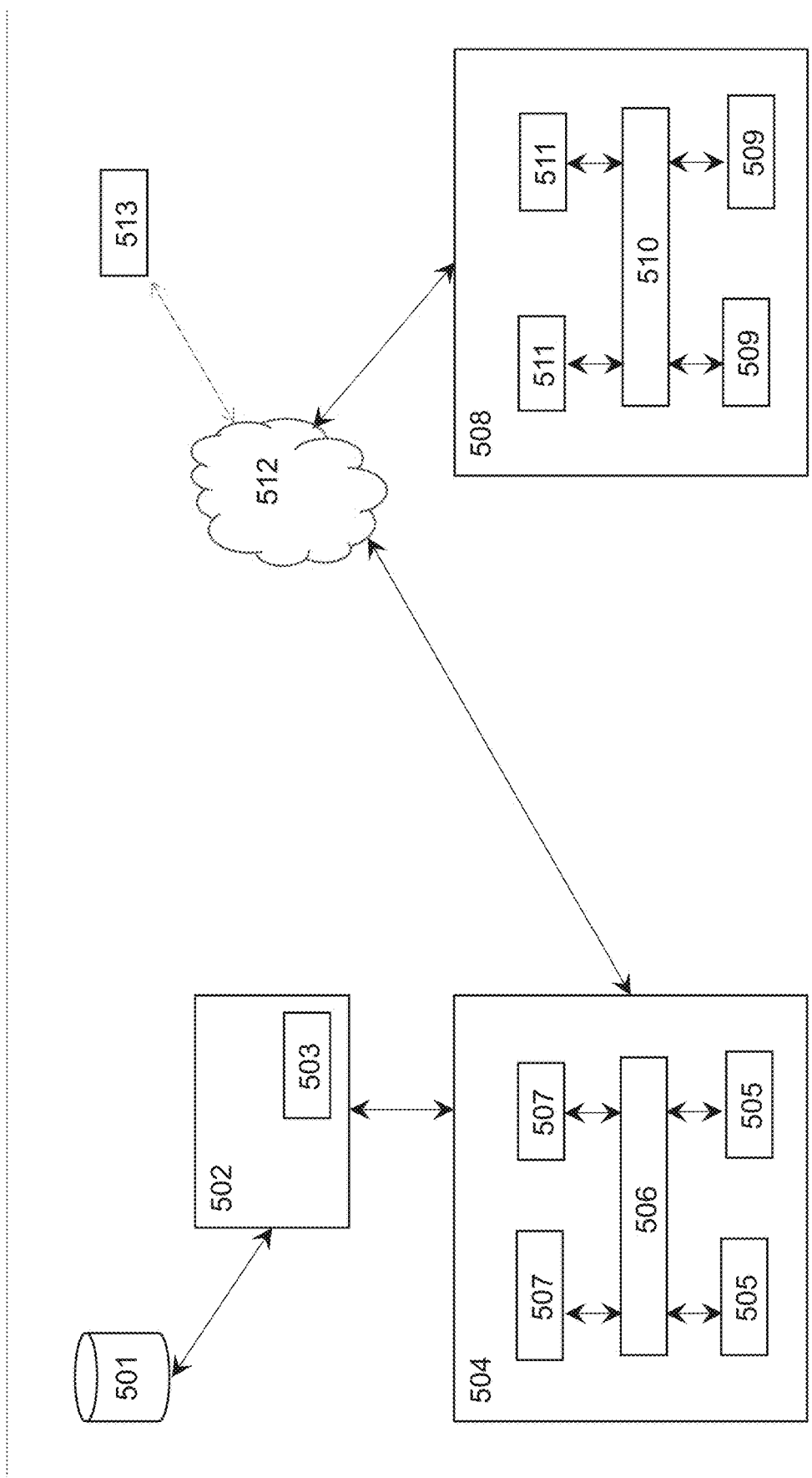
FIG. 5 is an exemplary system for carrying out embodiments of the present invention.

In some embodiments, the methods are carried out by a system that employs a client/server architecture such as, for example, the exemplary embodiments described as follows with reference to FIG. 5. The data that may be used as an input to the system and the outputs from the system(s) may be stored in one or more databases 501. Database server(s) 502 may include a database services management application 503 that manages storage and retrieval of data from the database(s) 401. The databases 501 may be relational databases; however, other data organizational structures may be used without departing from the scope of the present invention. Thus, for example, the electronic forms, as well as the data input into the forms, the calculated scores, and data relating to the decisions as to the data share request, may be stored in databases 501.

One or more application server(s) 504 are in communication with the database server 502. The application server 504 communicates requests for data to the database server 502. The database server 502 retrieves the requested data. The application server 504 may also send data to the database server 502 for storage in the database(s) 501. The application server 504 comprises one or more processors 505, non-transitory computer readable storage media 507 that store programs (computer readable instructions) for execution by the processor(s), and an interface 506 between the processor(s) 505 and computer readable storage media 507. The application server 504 may store the computer programs and code used to implement the methods of the present invention. Thus, for example, the application server 504 would store the software necessary to implement the electronic form, work flows, calculate a score from the responses, and make a decision as to whether the risk associated with the data share request is acceptable.

To the extent data and information is communicated over a network (e.g., the Internet or an Intranet), one or more network servers 508 may be employed. The network server 508 also comprises one or more processors 509, computer readable storage media 511 that store programs (computer readable instructions) for execution by the processor(s), and an interface 510 between the processor(s) 509 and computer readable storage media 511. The network server 508 is employed to deliver content that can be accessed through the communications network 512, e.g., by an end user employing computing device 513. When data is requested through an application, such as an Internet browser, the network server 508 receives and processes the request. The network server 508 sends the data or application requested along with user interface instructions for displaying an interface on device 513.

The computers referenced herein are specially programmed to perform the functionality described herein.

The non-transitory computer readable storage media (e.g., 507 or 511) that store the programs (i.e., software modules comprising computer readable instructions) may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system and processed.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A computer-implemented method, comprising:
receiving a data share request associated with a requestor device to share data with an unaffiliated third party, wherein the data share request identifies data;
providing a unified electronic form that presents one or more questions assessing a plurality of different risks associated with the data identified by the data request in real-time, wherein the one or more questions are selected from among a plurality of questions corresponding to the plurality of different risks, wherein the plurality of different risks are associated with a plurality of different validation endpoints, when the one or more questions are received at the requestor device, the one or more questions are presented by the unified electronic form at the requestor device in a sequence determined in real-time according to a workflow of a plurality of possible workflows;
receiving one or more answers in real-time, wherein the received answers are associated with the requestor device, wherein the received answers are provided in response to the one or more questions, wherein the received answers modify the sequence for one or more subsequent questions presented by the unified electronic form in real-time according to the workflow, and wherein the one or more subsequent questions are presented by the unified electronic form in the modified sequence;
determining that two or more of the plurality of different risks correspond to the received answers to the modified sequence of questions, wherein the determined risks are associated with two or more of the validation endpoints;
determining a score in real-time for each of the determined risks associated with sharing the data, wherein the score for each of the determined risks is based on the received answers to the modified sequence of questions that correspond to the respective determined risk;
determining to route the data share request in real-time to the two or more validation endpoints based on the score for each of the determined risks exceeding a corresponding threshold; and
routing the data share request in real-time to the two or more validation endpoints that are associated with the determined risks corresponding to the modified sequence of questions.

2. The computer-implemented method of claim 1, further comprising:
determining whether a prior relationship exists with an entity associated with the data share request, wherein when a prior relationship exists, the prior relationship is analyzed to determine whether a confidentiality provision exists.

3. The computer-implemented method of claim 1, wherein the one or more answers are validated by the two or more validation endpoints, and further comprising:
updating the score for each of the two or more determined risks based on the validation by the two or more validation endpoints.

4. The computer-implemented method of claim 1, wherein the one or more answers are evaluated to determine whether an answer is relevant to an organization.

5. The computer-implemented method of claim 1, wherein when an answer is relevant to an organization, additional review by the two or more validation endpoints is implemented to determine whether the data share request needs to be modified.

6. The computer-implemented method of claim 1, wherein how the data will be shared includes determining a form of data protection or encryption.

7. The computer-implemented method of claim 1, wherein the answers are associated with text or a numeric value, and wherein the score for each of the determined risks is determined based on an average of the numeric values associated with the answers to the questions that correspond to the respective determined risk.

8. The computer-implemented method of claim 1, wherein determining the score for each of the determined risks includes solving a deterministic combinatorial problem in real-time.

9. The computer-implemented method of claim 1, further comprising:
determining to process a quality control review when the score for at least one of the determined risks does not exceed the corresponding threshold, wherein the quality control review includes a review of data quality, a review of data usage, a review of the types of data being shared, or a determination of how the data will be shared;
determining an updated score for the at least one determined risk associated with sharing the data, wherein the score for the at least one determined risk is updated when all of the one or more answers are validated or unchallenged; and
transmitting the determination for implementation when the updated score for the at least one determined risk does not exceed the threshold.

10. The computer-implemented method of claim 1, further comprising:
determining that the data identified by the data request is subject to one or more internal requirements, standards, or policies, wherein presenting the one or more question is based on the determination.

11. The computer-implemented method of claim 1, further comprising:
monitoring the data share request for one or more changes; and
updating the routing of the data share request when the one or more changes are detected.

12. A system, comprising:
one or more data processors; and
a non-transitory computer-readable storage medium containing instructions which, when executed on the one or more data processors, cause the one or more data processors to perform operations including:
receiving a data share request to share data with an unaffiliated third party, wherein the data share request identifies data;
providing a unified electronic form that presents one or more questions assessing a plurality of different risks associated with the data identified by the data request in real-time, wherein the one or more questions are selected from among a plurality of questions corresponding to the plurality of different risks, wherein the plurality of different risks are associated with a plurality of different validation endpoints, and wherein when the one or more questions are received at a requestor device, the one or more questions are presented by the unified electronic form at the request device in a sequence determined in real-time according to a workflow of a plurality of possible workflows;

receiving one or more answers in real-time, wherein the received answers are associated with the requestor device, wherein the received answers are provided in response to the one or more questions, wherein the received answers modify the sequence for one or more subsequent questions presented by the unified electronic form in real-time according to the workflow, and wherein the one or more subsequent questions are presented by the unified electronic form in the modified sequence;

determining that two or more of the plurality of different risks correspond to the received answers to the modified sequence of questions wherein the determined risks are associated with two or more of the validation endpoints;

determining a score in real-time for each of the determined risks associated with sharing the data, wherein the score for each of the determined risks is based on the received answers to the modified sequence of questions that correspond to the respective determined risk;

determining to route the data share request in real-time to the two or more validation endpoints based on the score for each of the determined risks exceeding a corresponding threshold; and routing the data share request in real-time to the two or more validation endpoints that are associated with the determined risks corresponding to the modified sequence of questions.

13. The system of claim 12, wherein the operations further include:
determining whether a prior relationship exists with an entity associated with the data share request, wherein when a prior relationship exists, the prior relationship is analyzed to determine whether a confidentiality provision exists.

14. The system of claim 12, wherein the one or more answers are validated by the two or more validation endpoints, and wherein the operations further include:
updating the score for each of the two or more determined risks based on the validation by the two or more validation endpoints.

15. The system of claim 12, wherein the one or more answers are evaluated to determine whether an answer is relevant to an organization.

16. The system of claim 12, wherein when an answer is relevant to an organization, additional review by the two or more validation endpoints is implemented to determine whether the data share request needs to be modified.

17. The system of claim 12, wherein how the data will be shared includes determining a form of data protection or encryption.

18. The system of claim 12, wherein the answers are associated with text or a numeric value, and wherein the score for each of the determined risks is determined based on an average of the numeric values associated with the answers to the questions that correspond to the respective determined risk.

19. The system of claim 12, wherein determining the score for each of the determined risks includes solving a deterministic combinatorial problem in real-time.

20. The system of claim 12, wherein the operations performed by the processor further comprise:

determining to process a quality control review when the score for at least one of the determined risks does not exceed the corresponding threshold, wherein the quality control review includes a review of data quality, a review of data usage, a review of the types of data being shared, or a determination of how the data will be shared;

determining an updated score for the at least one determined risk associated with sharing the data, wherein the score for the at least one determined risk is updated when all of the one or more answers are validated or unchallenged; and transmitting the determination for implementation when the updated score for the at least one determined risk does not exceed the threshold.

21. The system of claim 12, wherein the operations performed by the processor further comprise:
determining that the data identified by the data request is subject to one or more internal requirements, standards, or policies, wherein presenting the one or more question is based on the determination.

22. The system of claim 12, wherein the operations performed by the processor further comprise:
monitoring the data share request for one or more changes; and
updating the routing of the data share request when the one or more changes are detected.

23. A computer-program product tangibly embodied in a non-transitory machine-readable storage medium, including instructions configured to cause a data processing apparatus to perform operations including:

receiving a data share request associated with a requestor device to share data with an unaffiliated third party, wherein the data share request identifies data;

providing a unified electronic form that presents one or more questions assessing a plurality of different risks associated with the data identified by the data request in real-time, wherein the one or more questions are selected from among a plurality of questions corresponding to the plurality of different risks, wherein the plurality of different risks are associated with a plurality of different validation endpoints, and wherein when the one or more questions are received at the requestor device, the one or more questions are presented by the unified electronic form at the requestor device in a sequence determined in real-time according to a workflow of a plurality of possible workflows;

receiving one or more answers in real-time, wherein the received answers are associated with the requestor device, wherein the received answers are provided in response to the one or more questions, wherein the received answers modify the sequence for one or more subsequent questions presented by the unified electronic form in real-time according to the workflow, and wherein the one or more subsequent questions are presented by the unified electronic form in the modified sequence;

determining that two or more of the plurality of different risks correspond to the received answers to the modified sequence of questions, wherein the determined risks are associated with two or more of the validation endpoints;

determining a score in real-time for each of the determined risks associated with sharing the data, wherein the score for each of the determined risks is based on the received answers to the modified sequence of questions that correspond to the respective determined risk;

determining to route the data share request in real-time to the two or more validation endpoints based on the score for each of the determined risks exceeding a corresponding threshold; and routing the data share request in real-time to the two or more validation endpoints that are associated with the determined risks corresponding to the modified sequence of questions.

24. The computer-program product of claim 23, further comprising instructions configured to cause a data processing apparatus to perform operations including:

determining whether a prior relationship exists with an entity associated with the data share request, wherein when a prior relationship exists, the prior relationship is analyzed to determine whether a confidentiality provision exists.

25. The computer-program product of claim 23, wherein the one or more answers are validated by the two or more validation endpoints, and further comprising:

updating the score for each of the two or more determined risks based on the validation by the two or more validation endpoints.

26. The computer-program product of claim 23, wherein the one or more answers are evaluated to determine whether an answer is relevant to an organization.

27. The computer-program product of claim 23, wherein when an answer is relevant to an organization, additional review by the two or more validation endpoints is implemented to determine whether the data share request needs to be modified.

28. The computer-program product of claim 23, wherein how the data will be shared includes determining a form of data protection or encryption.

29. The computer-program product of claim 23, wherein the answers are associated with text or a numeric value, and wherein the score for each of the determined risks is determined based on an average of the numeric values associated with the answers to the questions that correspond to the respective determined risk.

30. The computer-program product of claim 23, wherein determining the score for each of the determined risks includes solving a deterministic combinatorial problem in real-time.

31. The computer-program product of claim 23, further comprising instructions configured to cause a data processing apparatus to perform operations including:

determining to process a quality control review when the score for at least one of the determined risks does not exceed the corresponding threshold, wherein the quality control review includes a review of data quality, a review of data usage, a review of the types of data being shared, or a determination of how the data will be shared;

determining an updated score for the at least one determined risk associated with sharing the data, wherein the score for the at least one determined risk is updated when all of the one or more answers are validated or unchallenged; and transmitting the determination for implementation when the updated score for the at least one determined risk does not exceed the threshold.

32. The computer-program product of claim 23, further comprising instructions configured to cause a data processing apparatus to perform operations including:

determining that the data identified by the data request is subject to one or more internal requirements, standards, or policies, wherein presenting the one or more question is based on the determination.

33. The computer-program product of claim 23, further comprising instructions configured to cause a data processing apparatus to perform operations including:

monitoring the data share request for one or more changes; and updating the routing of the data share request when the one or more changes are detected.

* * * * *